(12) United States Patent
Curtin et al.

(10) Patent No.: US 10,891,374 B1
(45) Date of Patent: Jan. 12, 2021

(54) SYSTEMS AND METHODS FOR IMPROVING PERFORMANCE OF CASCADE CLASSIFIERS FOR PROTECTING AGAINST COMPUTER MALWARE

(71) Applicant: CA, INC., San Jose, CA (US)

(72) Inventors: Ryan Curtin, Atlanta, GA (US); Keith Kenemer, Rosewell, GA (US)

(73) Assignee: CA, INC., San Jose, CA (US)

( * ) Notice: Subject to any disclaimer, the term of this patent is extended or adjusted under 35 U.S.C. 154(b) by 330 days.

(21) Appl. No.: 15/938,377

(22) Filed: Mar. 28, 2018

(51) Int. Cl.
*G06F 21/56* (2013.01)
*G06N 20/00* (2019.01)

(52) U.S. Cl.
CPC ............. *G06F 21/56* (2013.01); *G06N 20/00* (2019.01); *G06F 2221/034* (2013.01)

(58) Field of Classification Search
CPC .... G06F 21/56; G06F 2221/034; G06N 20/00
See application file for complete search history.

(56) References Cited

U.S. PATENT DOCUMENTS

| | | | | |
|---|---|---|---|---|
| 8,407,798 B1* | 3/2013 | Lotem | ..................... | G06F 21/55 726/18 |
| 9,449,259 B1* | 9/2016 | Cheng | ..................... | G06N 20/00 |
| 10,218,716 B2* | 2/2019 | Huang | ................ | H04L 63/1408 |
| 10,452,839 B1* | 10/2019 | Curtin | .................... | G06N 20/00 |
| 2015/0213365 A1* | 7/2015 | Ideses | .................. | H04L 67/125 706/12 |
| 2016/0335432 A1* | 11/2016 | Vatamanu | ........... | H04L 63/1425 |
| 2019/0310979 A1* | 10/2019 | Masuzaki | ........... | G06F 16/2465 |

OTHER PUBLICATIONS

Rekik et al, "Cyber-physical Threats and Vulnerabilities Analysis for Train Control and Monitoring Systems", 2018, IEEE, p. 1-6.*

* cited by examiner

*Primary Examiner* — Christopher A Revak
(74) *Attorney, Agent, or Firm* — FisherBroyles, LLP (57) ABSTRACT

The disclosed computer-implemented method for improving performance of cascade classifiers for protecting against computer malware may include receiving a training dataset usable to train a cascade classifier of a machine-learning classification system. A sample to add to the training dataset may be received. A weight for the sample may be calculated. The training dataset may be modified using the sample and the weight. A weighted training for the cascade classifier of the machine-learning classification system may be performed using the modified training dataset. Computer malware may be identified using the cascade classifier. In response to identifying the computer malware, a security action may be performed to protect the one or more computing devices from the computer malware. Various other methods, systems, and computer-readable media are also disclosed.

20 Claims, 7 Drawing Sheets

SYSTEMS AND METHODS FOR IMPROVING PERFORMANCE OF CASCADE CLASSIFIERS FOR PROTECTING AGAINST COMPUTER MALWARE

BACKGROUND

Many machine-learning classification systems may depend on machine-learning classifiers to detect when unknown samples come from a population of interest (e.g., spam, targeted emails, or malware). Typically, these classifiers are trained using a set of training data that includes samples that are known or believed to come from the population of interest.

Unfortunately, traditional machine-learning approaches to classification using, for example, cascade classifying systems may not perform well when trained on all samples of a training dataset. For example, a cascade classifying system of a machine-learning classification system may have many multistage classifiers, where points or samples are traverse through the system of classifiers until they are classified. In some examples, points or samples can be labeled malicious or clean/benign. By the nature of the structure of the cascade classifiers, only a subset of points is likely to be seen by lower-level classifiers, but these classifiers are often trained on all points of a training dataset, resulting in inaccurate classifications by the system. The instant disclosure, therefore, identifies and addresses a need for systems and methods for training classifiers.

SUMMARY

As will be described in greater detail below, the instant disclosure describes various systems and methods for training classifiers used to identify malware. In one example, a method for improving performance of cascade classifiers for protecting against computer malware may include (i) receiving a training dataset usable to train a cascade classifier of a machine-learning classification system, (ii) receiving a sample to add to the training dataset, (iii) calculating a weight for the sample, (iv) modifying the training dataset using the sample and the weight, (v) performing a weighted training for the cascade classifier of the machine-learning classification system using the modified training dataset, (vi) identifying computer malware using the cascade classifier, and (vii) in response to identifying the computer malware, performing a security action to protect the one or more computing devices from the computer malware.

In some examples, the step of calculating the weight for the sample may include obtaining a depth of the sample in the machine-learning classification system, receiving a target location for the cascade classifier, and calculating the weight for the sample using the depth of the sample and the target location for the cascade classifier. The depth of the sample may be a location of the sample in the machine-learning classification system. The target location of the cascade classifier may be a location for the cascade classifier to be inserted into the machine-learning classification system.

In some examples, the method may further include adding noise to the weight to regularize the cascade classifier during the weight training. In some examples, the method may further include (i) receiving an additional sample to add to the training dataset usable to train the cascade classifier of the machine-learning classification system, (ii) calculating an additional weight, (iii) remodifying the training dataset using the additional sample and the additional weight, and (iv) performing an additional weighted training for the cascade classifier of the machine-learning classification system using the remodified training dataset.

In some examples, the training dataset comprises a set of samples and a label for each of the set of samples, wherein the label for each of the set of samples includes a respective weight for each of the set of samples. The training dataset may include malicious applications and/or benign applications. In other examples, the training dataset may include malicious webpages and/or benign webpages. In at least one example, the training dataset may include malicious emails and/or benign emails. In some examples, the security action may include using an additional cascade classifier of the machine-learning classification system, flagging the sample for a remedial action, and/or removing the sample In one embodiment, a system for protecting against computer malware may include one or more computing devices comprising at least one physical processor. The system may include physical memory that includes computer-executable instructions that, when executed by the at least one physical processor, may cause the one or more computing devices to (i) receive a training dataset usable to train a cascade classifier of a machine-learning classification system, (ii) receive a sample that is to be added to the training dataset, (iii) calculate a weight for the sample, (iv) modify the training dataset using the sample and the weight, (v) perform a weighted training for the cascade classifier of the machine-learning classification system using the modified training dataset, (vi) identify computer malware using the cascade classifier, and (vii) in response to identifying the computer malware, perform a security action to protect the one or more computing devices from the computer malware. In at least one example, the system may also include at least one physical processor that executes the receiving module, the weighting module, the modifying module, the training module, the determining module, and the security module.

In some examples, the computer-executable instructions may further cause the one or more computing devices to obtain a depth of the sample in the machine-learning classification system, receive a target location for the cascade classifier, and calculate the weight for the sample using the depth of the sample and the target location for the cascade classifier. In some examples, the depth of the sample may be a location of the sample in the machine-learning classification system. In some examples, the target location of the cascade classifier may be a location for the cascade classifier to be inserted into the machine-learning classification system.

In some examples, the computer-executable instructions may further cause the one or more computing devices to add noise to the weight to regularize the cascade classifier during the weighted training. In some examples, the computer-executable instructions may further cause the one or more computing devices to receive an additional sample to add to the training dataset usable to train the cascade classifier of the machine-learning classification system, calculate an additional weight, remodify the training dataset using the additional sample and the additional weight, and perform an additional weighted training for the cascade classifier of the machine-learning classification system using the remodified training dataset.

In some examples, the training dataset may include a set of samples and a label for each of the set of samples. The label for each of the set of samples may include a respective weight for each of the set of samples. In some examples, the training dataset may include malicious applications and/or benign applications. In other examples, the training dataset may include malicious webpages and/or benign webpages. In some examples, the security action comprises one or more of (i) using an additional cascade classifier of the machine-learning classification, (ii) flagging the sample for a remedial action, or (iii) removing the sample.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a training dataset usable to train a cascade classifier of a machine-learning classification system, (ii) receive a sample to add to the training dataset, (iii) calculate a weight for the sample, (iv) modify the training dataset using the sample and the weight, (v) perform a weighted training for the cascade classifier of the machine-learning classification system using the modified training dataset, (vi) identify malware using the cascade classifier, and (vii) perform a security action in response to identifying the malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for improving performance of cascade classifiers for protecting against computer malware. As will be explained in greater detail below, training points or samples in a training dataset may be weighted according to how likely they are to proceed down a cascade classifier system. Points or samples in the training dataset that are classified further down the cascade classifier system may be more important for training and may be given more weight than those points that are classified earlier in the cascade classifier system. Additionally, random noise may be added to the weights for each of the points in the training dataset to regularize the cascade classifier and avoid overfitting to artifacts of the cascade classifier system. Thus, by using a modified training dataset to train a cascade classifier of a machine-learning classification system, the systems and methods described herein may enable a machine-learning classification system to more accurately classify the unknown samples, thus improving the performance and accuracy of the cascade classifier.

In addition, the systems and methods described herein may improve the functioning of a computing device by detecting potentially malicious files, webpages, or emails with increased accuracy and thus reducing the computing device's likelihood of infection. These systems and methods may also improve the fields of computer security and/or enterprise-level security by tailoring the cascade classifiers that are used to classify unknown samples to the unknown samples. Embodiments of the instant disclosure may also provide various other advantages and features, as discussed in greater detail below.

In some examples, the systems and methods described herein may obtain the type of classifier to be trained, an approximate location in the cascade classifying system a new cascade classifier is to be inserted or placed, and a training dataset, which may include labels. The labels may be used to reflect weights calculated for the points of the training dataset. The systems and methods described herein provide techniques for weighting the training data given knowledge of the target location of the cascade classifier to be trained. Two competing factors for weights may be considered: (a) if a point makes it further down the cascade, the label in the training data may be questionable and thus may be weighted less, and (b) if a point make it further down the cascade, then the weight for the point should be increased so that the new cascade classifier is more likely to classify it correctly. By focusing modification of the training datasets specifically on samples that are more relevant for each cascade classifier, the efficacy of the machine-learning classification system may be increased and fewer false positives may be identified by the system. Additionally, by using weighted training datasets, the cascade classifiers that are being trained may be individually prepared, at different times, with different training datasets, and in some instances, different feature sets.

Figure 1:
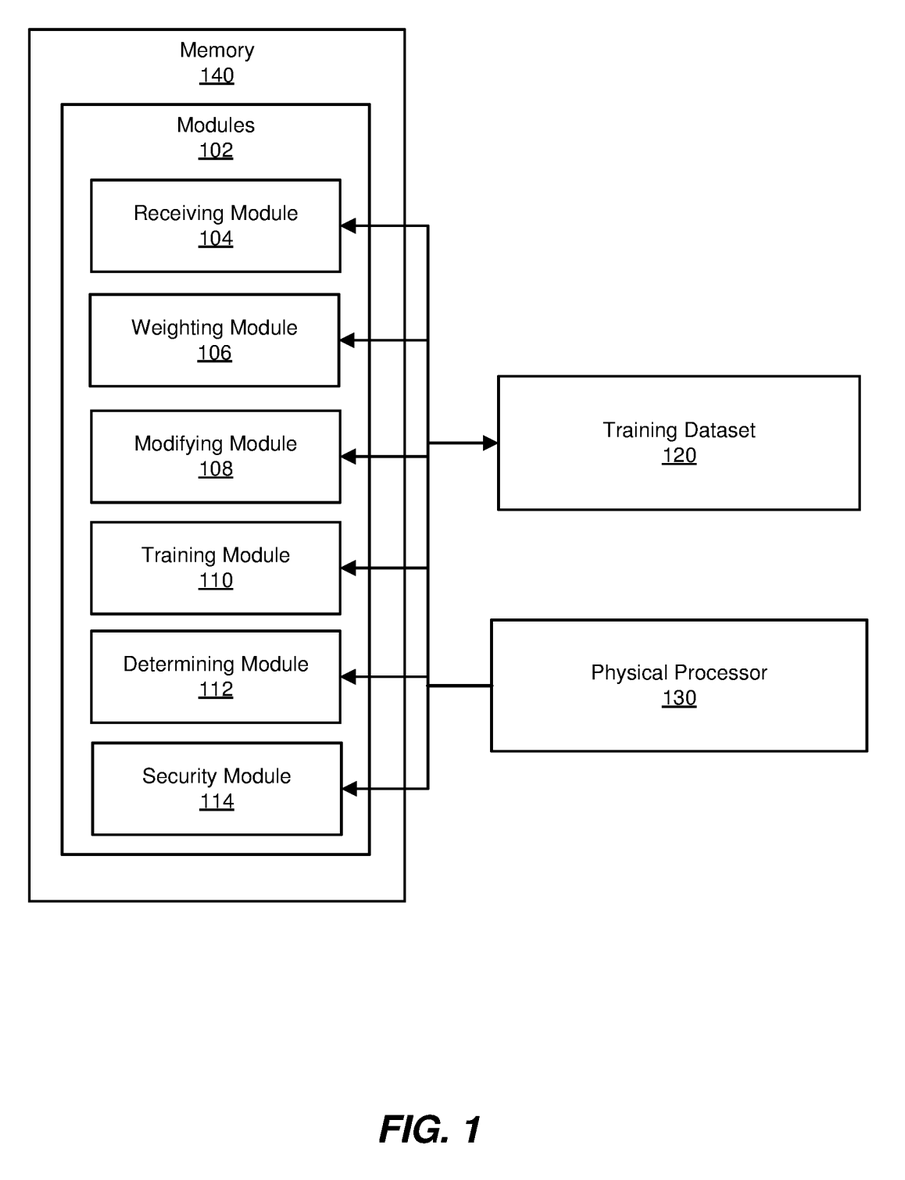
FIG. 1 is a block diagram of an example system for improving performance of cascade classifiers for protecting against computer malware.
Figure 2:
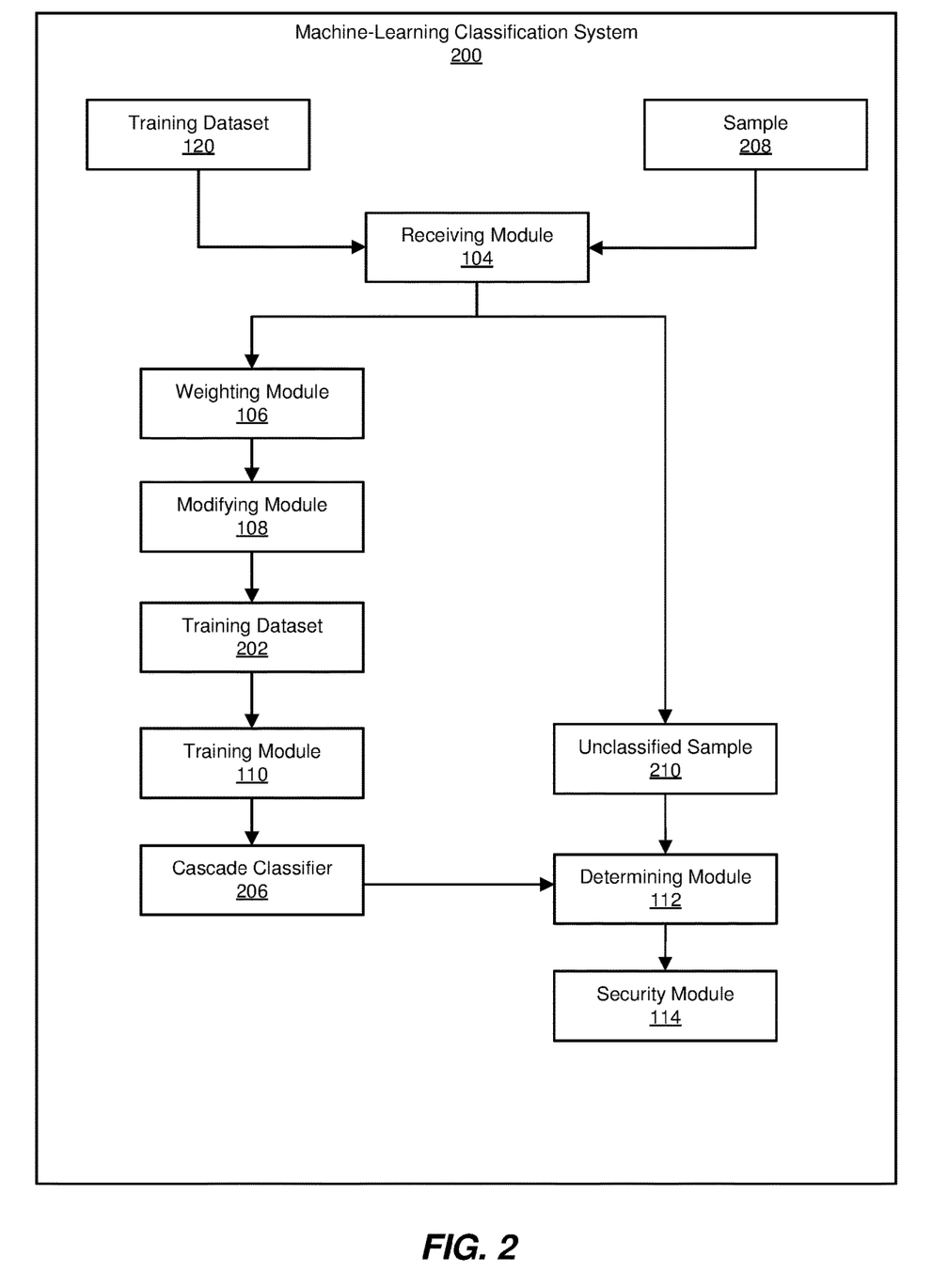
FIG. 2 is a block diagram of an additional example system for improving performance of cascade classifiers for protecting against computer malware.

The following will provide, with reference to FIGS. 1-2, detailed descriptions of example systems for improving performance of cascade classifiers for protecting against computer malware. Detailed descriptions of corresponding computer-implemented methods will also be provided in connection with FIG. 3. Detailed descriptions of a cascade classifier system and training datasets are provided in connection with FIGS. 4-5. In addition, detailed descriptions of an example computing system and network architecture capable of implementing one or more of the embodiments described herein will be provided in connection with FIGS. 6 and 7, respectively.

FIG. 1 is a block diagram of an example system 100 for improving performance of cascade classifiers for protecting against computer malware. As illustrated in this figure, example system 100 may include one or more modules 102 for performing one or more tasks. As will be explained in greater detail below, modules 102 may include a receiving module 104, a weighting module 106, a modifying module 108, a training module 110, a determining module 112, and a security module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices that make up machine-learning classification system 200 illustrated in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally, or alternatively, physical processor 130 may execute one or more of modules 102 to facilitate improving performance of cascade classifiers for protecting against computer malware. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more training datasets, such as training dataset 120. Training dataset 120 generally represents any type or form of data that may be used to train cascade classifiers of a machine-learning classification system. In one example, training dataset 120 may of a set of points or samples that are each associated with a respective weight and used to train a machine-learning classifier to identify other samples from the population.

Example system 100 in FIG. 1 may be implemented in a variety of ways. For example, all or a portion of example system 100 may represent portions of example machine-learning classification system 200 in FIG. 2. As will be described in greater detail below, one or more of modules 102 from FIG. 1 may, when executed by at least one processor of machine-learning classification system 200, enable machine-learning classification system 200 to improving performance of cascade classifiers for protecting against computer malware. For example, and as will be described in greater detail below, one or more of modules 102 may cause machine-learning classification system 200 to (i) receive training dataset 120 by receiving module 104, (ii) receive an unweighted sample 208 by receiving module 104, (iii) calculate a weight for unweighted sample 208 by weighting module 106, (iv) modify training dataset 120 using sample 208 and calculated weight, (v) train a cascade classifier 206 of machine-learning classification system 200 by training module 110 using the modified training dataset 120, (vi) receive by receiving module 104 unclassified sample 210, (vii) determine by determining module 112 using cascade classifier 206 that the unclassified sample 210 is malware, and (viii) perform a security action by security module 114 in response to determining that unclassified sample 210 is malware.

Machine-learning classification system 200 generally represents any type or form of computing device or computing devices capable of reading computer-executable instructions. Examples of machine-learning classification system 200 may include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device. Additional examples of machine-learning classification system 200 include, without limitation, security servers, application servers, web servers, storage servers, and/or database servers configured to run certain software applications and/or provide various security, web, storage, and/or database services. Although illustrated as a single entity in FIG. 2, machine-learning classification system 200 may include and/or represent a plurality of servers that work and/or operate in conjunction with one another.

Training dataset 120 generally represents any type or form of data, statistics, and/or other information known about the features of a set of samples that are known or believed to come from a population of interest and that may be used to train a machine-learning classifier to identify unknown or unclassified samples that also belong to the population of interest. Examples of training dataset 120 include, without limitation, information about a set of applications that are known to be malicious or benign that may be used to train a cascade classifier to classify newly encountered applications as either malicious or benign, information about a set of webpages that are known to be malicious or benign that may be used to train a cascade classifier to classify newly encountered webpages as either malicious or benign, and/or information about a set of emails that are known to be malicious or benign that may be used to train a cascade classifier to classify newly encountered emails as either malicious or benign. Sample 208 may be an unweighted sample to insert into training dataset 120 with a corresponding calculated weight. Sample 208 and its corresponding weight may be used to train a cascade classifier to classify newly encountered data as malware or non-malware. Cascade classifier 206 generally represents any algorithm, formula, rule, module, and/or filter for classifying, labeling, categorizing, rating, and/or scoring an input. Examples of cascade classifier 206 include, without limitation, a linear classifier, a non-linear classifier, a perceptron, a naive Bayes classifier, a support vector machine, a neural network, a decision tree, and/or any other suitable classification algorithm.

Figure 3:
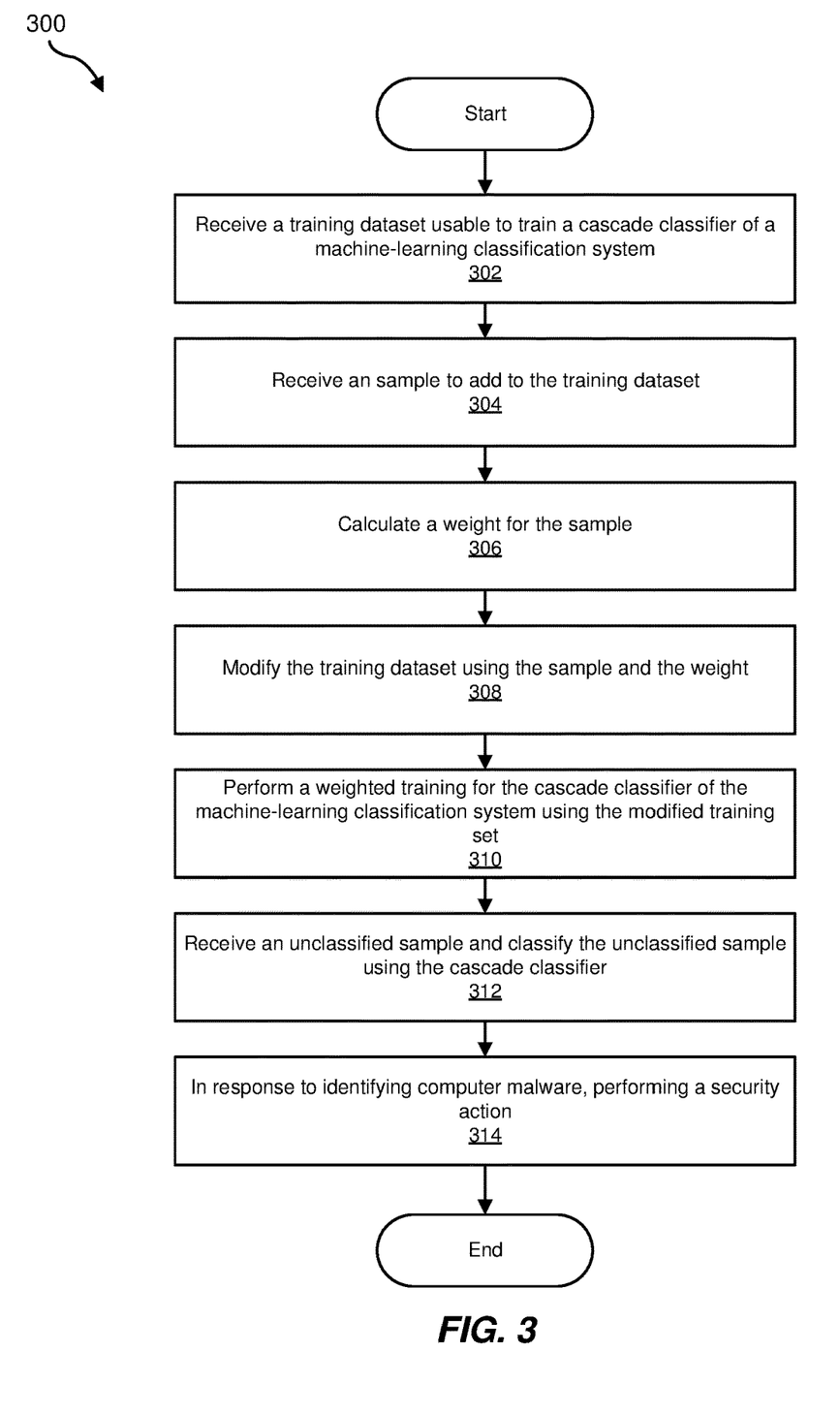
FIG. 3 is a flow diagram of an example method for improving performance of cascade classifiers for protecting against computer malware.

FIG. 3 is a flow diagram of an example computer-implemented method 300 for improving performance of cascade classifiers for protecting against computer malware. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive a training data set usable to train cascade classifiers of a machine-learning classification system. For example, receiving module 104 may, as part of machine-learning classification system 200 in FIG. 2, receive a training dataset 120 that may be used by training module 110 to train a cascade classifier 206 of machine-learning classification system 200.

The systems described herein may perform step 302 in any suitable manner. For example, receiving module 104 may receive a training dataset from one or more human analysts that have manually labeled samples represented in the training dataset. In other examples, receiving module 104 may compile a training dataset that includes samples that have been labeled by a machine-learning classification system using a suitable unsupervised or semi-supervised machine-learning technique. In some examples, receiving module 104 may receive a training dataset that has already been used to train a cascade classifier. In other examples, receiving module 104 may receive a training dataset that will be used to train a cascade classifier.

At step 304, one or more of the systems described herein may receive an unweighted sample to add to the training data set usable to train cascade classifiers of a machine-learning classification system. For example, receiving module 104 may, as part of machine-learning classification system 200 in FIG. 2, receive sample 208 that may be added to a training dataset 120.

The systems described herein may perform step 304 in any suitable manner. For example, receiving module 104 may receive an unweighted sample from one or more human analysts. In other examples, receiving module 104 may identify an unweighted sample by a machine-learning classification system using a suitable unsupervised or semi-supervised machine-learning technique.

As illustrated in FIG. 3, at step 306, one or more of the systems described herein may calculate a weight for the received sample. For example, weighting module 106 may, as part of machine-learning classification system 200 in FIG. 2, may calculate a weight for sample 208.

As used herein, the term "weight" generally refers to a label of a sample which may indicate importance or influence of the sample in training a cascade classifier. In some examples, the term "weight" may refer to a value indicative of the importance or influence of the sample in training a cascade classifier.

Returning to FIG. 3, the systems described herein may calculate a weight for the sample using any suitable weighting techniques. In at least one example, weighting module 106 may receive a depth of the received sample 208. The term "depth" may refer to the location of the sample 208 in the machine-learning classification system. For example, the depth of the received sample 208 may be the location of the sample in a cascade classifier system. In one example, 0 may indicate that a sample is classified by the first cascade classifier of the cascade classifier system, whereas 1 may indicate that a sample traversed the entire cascade classifier system and reached the final cascade classifier. The term "target" may refer to a location for a cascade classifier to be inserted into the machine-learning classification system. In some examples, the target of a cascade classifier may indicate a location for the cascade classifier in a cascade classifier system. The target of a cascade classifier may be received from a human analyst or otherwise obtained by a machine-learning classification system using a suitable unsupervised or semi-supervised machine-learning technique.

In some examples, the depth of sample 208 may be represented as $d(x)$, where x is indicative of sample 208. The target of the cascade classifier may be represented as t. First, a noisy depth may be calculated based on the depth of sample 208. This may be represented as:

$$\text{noisydepth}(x) = \text{depth}(x) + \text{truncated Gaussian noise}.$$

Gaussian noise may be statistical noise having a probability density function equal to that of a normal distribution. Using the Gaussian may result in the most weight being given to samples that fall near the desired location in the cascade classifier system. The noise may help regularize the cascade classifier, preventing the cascade classifier from overfitting to artifacts of the cascade classifier. Using the calculated noisydepth value, the weight may be calculated using the following:

$$\text{weight}(x) = (1 - \text{noisydepth}(x)) * \exp(-(\text{noisydepth}(x) - t)^2 / 2 * \text{sigma}^2).$$

The first term in the weight function (e.g., $(1 - \text{noisydepth}(x))$) may provide more confidence for points or samples landing higher in the cascade classifier system. The second term of the weight function may provide weight points in a desired target area. In this manner, the systems and methods described herein may generate a weight for each sample of a training dataset for machine-learning classification system's classifiers.

Referring back to FIG. 3, at step 308, one or more of the systems described herein may modify the training dataset 120 using the sample and corresponding weight. For example, modifying module 108 may, as part of machine-learning classification system 200 in FIG. 2, modify training dataset 120 using sample 208 and the weight calculated at step 306. In some examples, the modifying module 108 may add the weight calculated at step 306 to a label of sample 208. The modifying module 108 may add sample 208 to training dataset 120.

At step 310, one or more of the systems described herein may perform a weighted training for a cascade classifier of the machine-learning classification system using the modified training dataset. For example, training module 110 may, as part of machine-learning classification system 200 in FIG. 2, train using sample 208 and the weight calculated at step 306. In some examples, the modifying module 108 may add the weight calculated at step 306 to a label of sample 208. The modifying module 108 may add sample 208 to training dataset 202.

At step 312, one or more of the systems described herein may receive an unclassified or unknown sample and may use the cascade classifier trained using the modified training dataset to classify the unclassified or unknown sample. For example, receiving module 104 may, as part of machine-learning classification system 200 in FIG. 2, receive unclassified sample 210. Using the trained cascade classifier 206, determining module 112 may determine that unclassified sample 210 is malicious computer malware or a benign sample. If unclassified sample 210 is benign, the classification may be noted (e.g., unclassified sample 210 may be associated with a classification, such as via a label). Exemplary method 300 in FIG. 3 may terminate in response to unclassified sample 210 being classified as benign. If unclassified sample 210 is determined by determining module 112 to be malicious (e.g., computer malware), the method may proceed to step 314.

At step 314, one or more of the systems described herein, in response to identifying computer malware, may perform a security action. In some examples, the security action is performed to protect computing devices from computer malware. For example, security module 114 may, as part of machine-learning classification system 200 in FIG. 2, perform a security action in response to determining that unclassified sample 210 is classified as malicious by determining module 112.

The systems described herein may perform step 314 in any suitable manner. As mentioned above, a machine-learning cascade classifier 206 that is trained using a weighted training dataset 120 may accurately classify unknown samples as malicious or benign. In one example, security module 114 may, in response to determining that an unknown sample (e.g., unclassified sample 210) is classified as malicious (e.g., computer malware) by the weighted training dataset 120, may perform a security action. Examples of security actions may include using an additional cascade classifier of the machine-learning classification system for further analysis, flagging the sample for removal or other remedial action, removing the identified malicious sample, or the like. Upon completion of step 314, exemplary method 300 in FIG. 3 may terminate.

Figure 4:
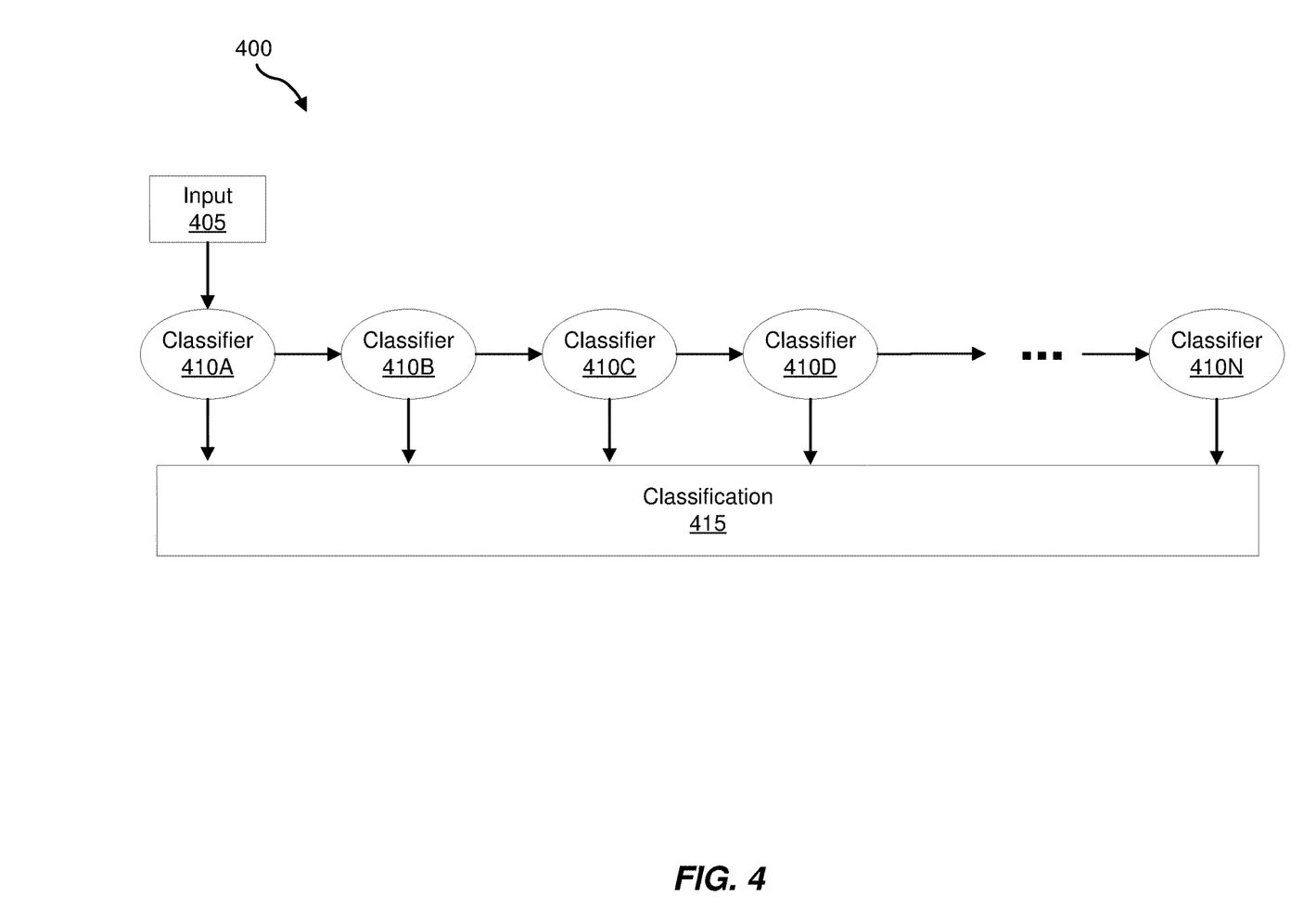
FIG. 4 is a block diagram of an example cascade classifier system.

FIG. 4 is a block diagram of an example cascade classifier system 400 improving performance of cascade classifiers for protecting against computer malware. One or more of the systems described herein may receive input 405 to be classified by a machine-learning classification system 200. For example, receiving module 104 may, as part of machine-learning classification system 200 in FIG. 2, receive input 405 to be classified by determining module 112. In some examples, input 405 may be one or more unclassified samples 210. Examples of input may include, but are not limited to, one or more applications that may be malicious or benign, information about one or more webpages that may be malicious or benign, and/or information about one or more emails that are known to be malicious or benign. The input 405 may be submitted to the cascade classifier system 400 for classification. For example, the cascade classifier system 400 may determine whether input 405 is malware (e.g., whether input 405 is malicious or benign). Classifier 410A may be applied to the input. If classifier 410A is able to classify input 405, a classification 415 may be made. In some sssssexamples, in response to a classification 415 of input 405, the classification 415 may be associated with the input 405, such as by adding classification 415 to a label of input 405. If classifier 410A is not able to classify input 405, input 405 may be passed to classifier 410B. Classifier 410B may be applied to input 405. This process may be repeated until input 405 is classified or the last classifier (e.g., classifier 410N) is reached. In response input 405 being classified, security module 114 may perform a security action. In some examples, security module 114 may identify any input 405 or samples classified as malicious and may perform a security action in response to the identification.

Figure 5:
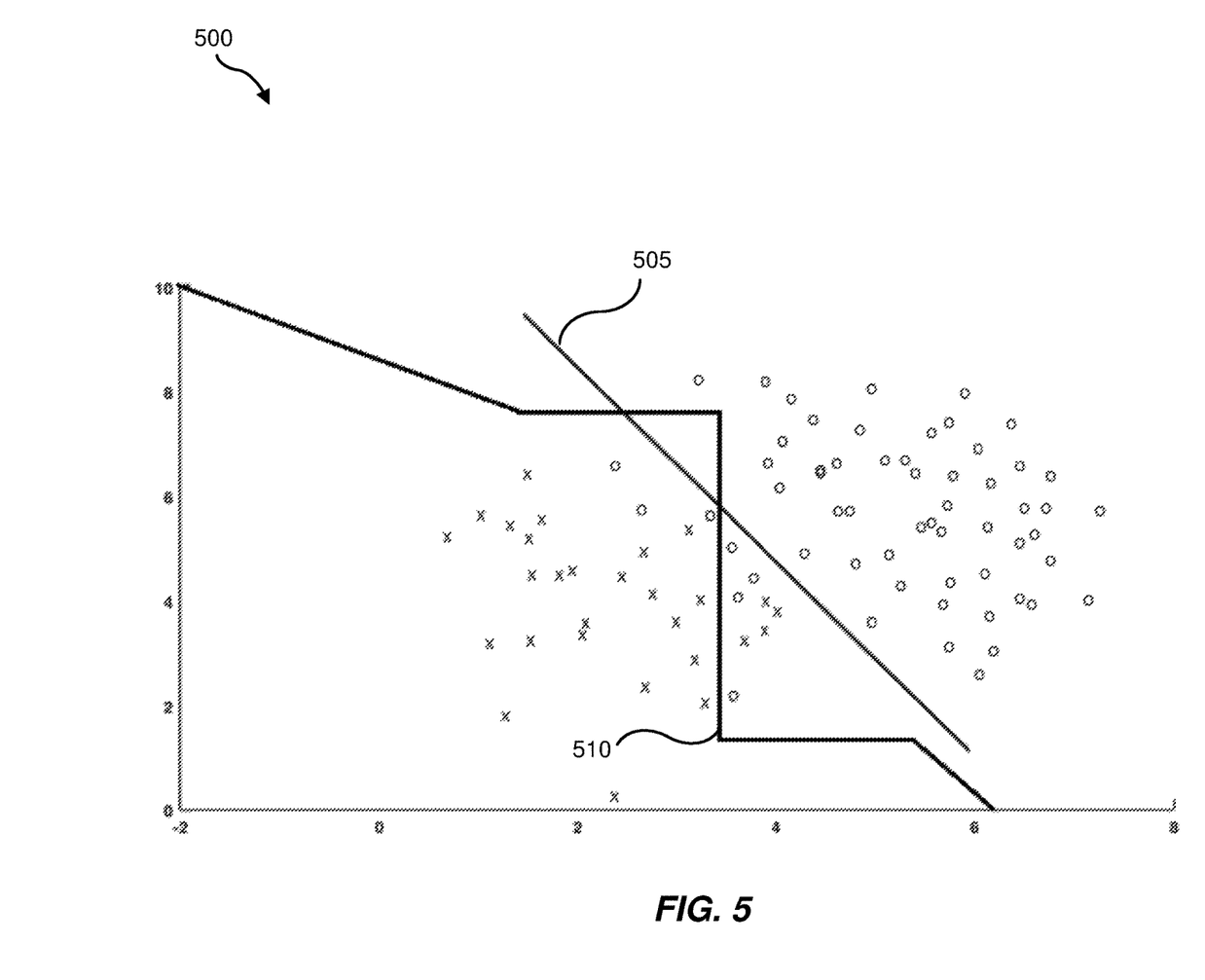
FIG. 5 is a diagram of an example training dataset for a machine-learning classification system.

FIG. 5 is a diagram of an example training dataset 500 for a machine-learning classification system. As illustrated in FIG. 5, a training dataset 500 that includes both malicious and benign samples are depicted. Malicious samples are depicted by Xs and benign samples are depicted by Os. Traditional methods for training a cascade classifier require a cascade classifier to be trained on the full training dataset, which may result in poor performance. As depicted, cascade classifier 505 is not able to accurately classify between the malicious (Xs) and benign (Os) samples. Cascade classifier 510 is trained using a weighted training dataset and can more accurately classify between the malicious (Xs) and benign (Os) samples.

As explained above, by training individual cascade classifiers of a machine-learning classification system using a modified training dataset, the systems and methods described herein may enable a machine-learning classification system to more accurately identify potential malware. Traditional systems may train cascade classifiers on an entire dataset which may have resulted in misclassifications of the unknown samples. However, by using a modified training dataset that has weighted samples, the systems and methods described herein may result in improving the performance and accuracy of the cascade classifier, thus reducing the number of false positive identifications of malware.

Figure 6:
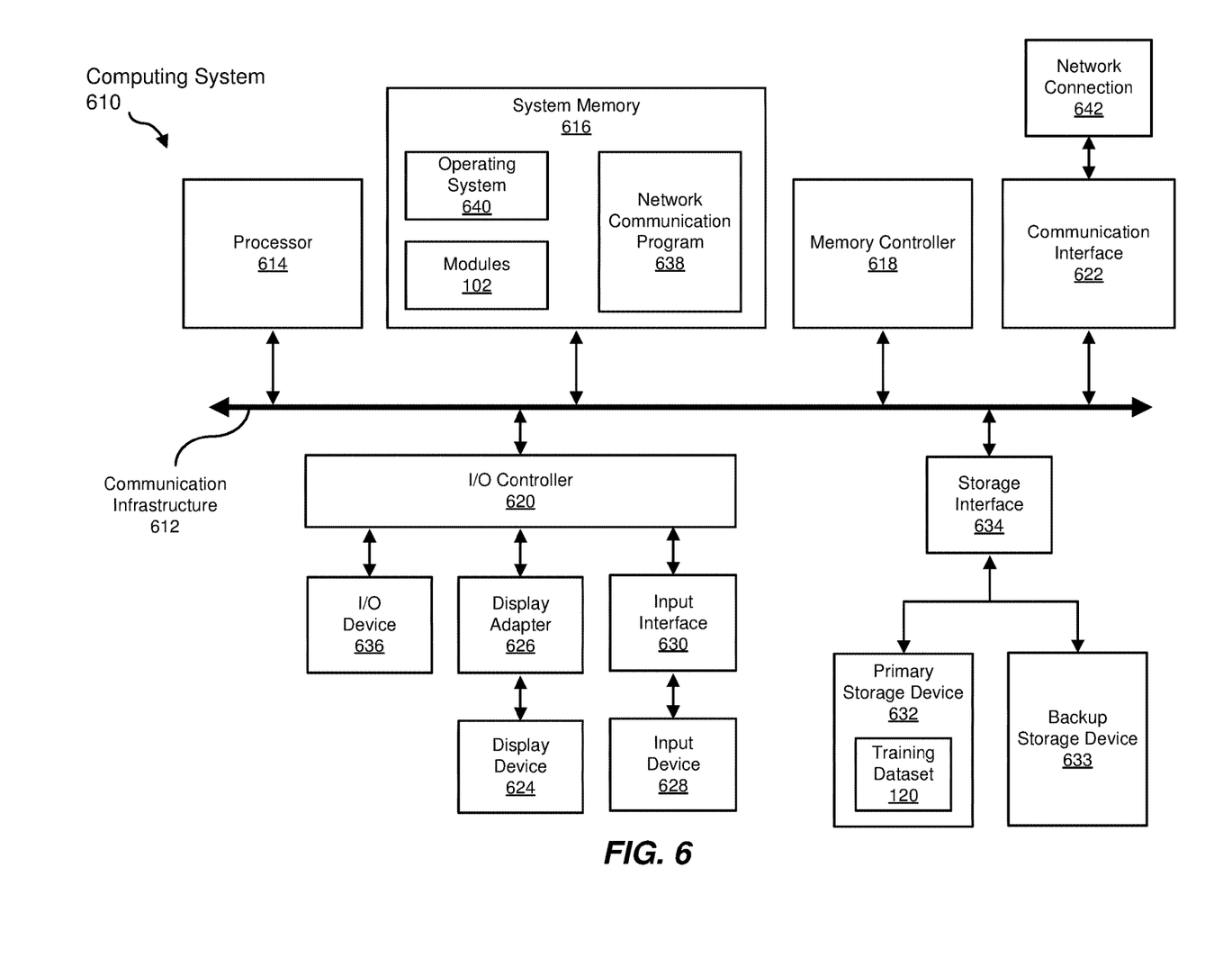
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally, or alternatively, example computing system 610 may include additional I/O devices. For example, example computing system 610 may include I/O device 636.

In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, training dataset 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally, or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
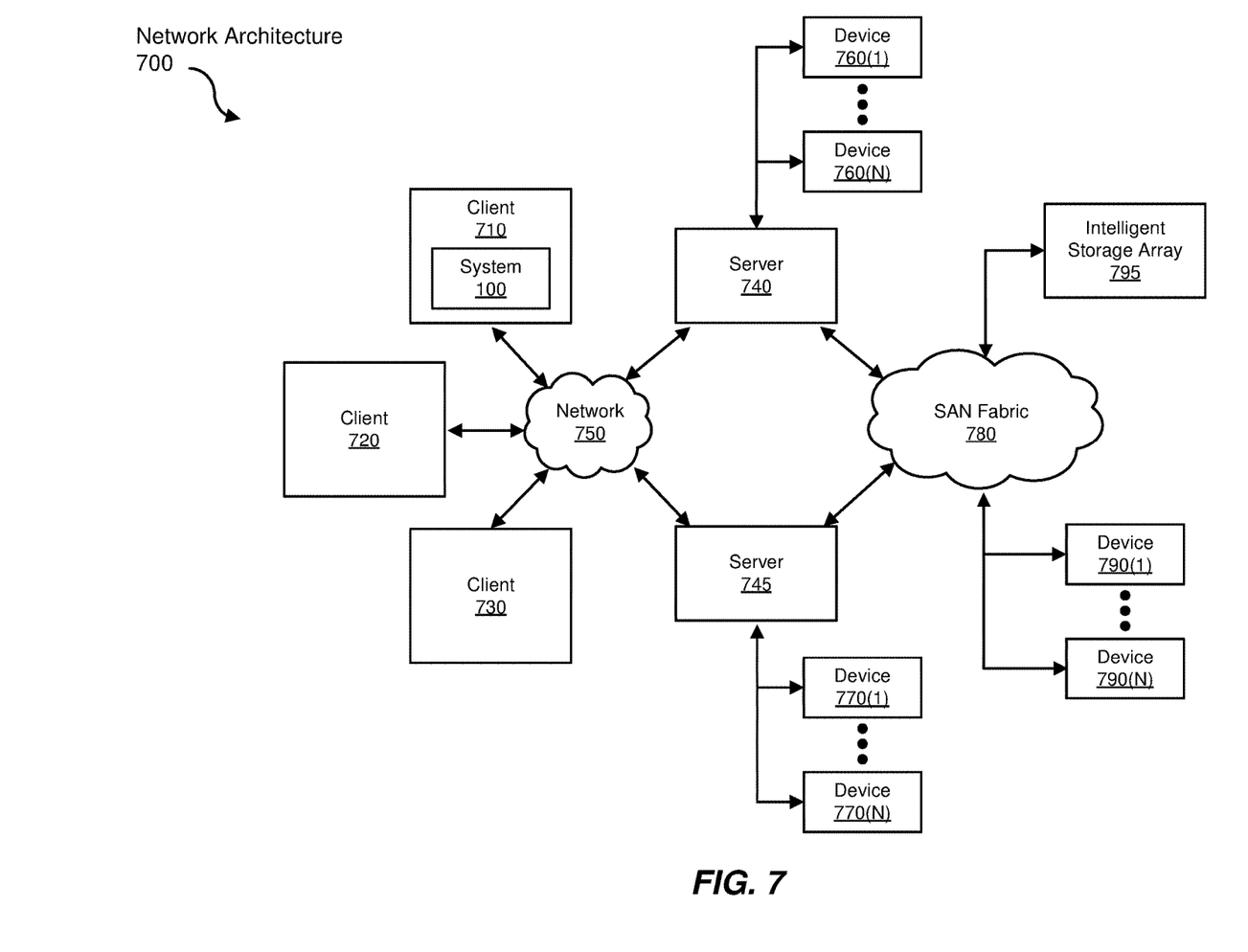
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for improving performance of cascade classifiers for protecting against computer malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive unweighted samples to train cascade classifiers of a machine-learning classification system, transform the unweighted samples into a weighted training dataset, output a result of the transformation to the machine-learning classification system, use the result of the transformation to determine whether an unknown sample falls within a classification (e.g., malicious, benign, etc.), and store the result of the transformation to a storage system. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving performance of cascade classifiers for protecting against computer malware, the method being performed by one or more computing devices comprising at least one processor, the method comprising:
   receiving a training dataset usable to train a cascade classifier of a machine-learning classification system;
   receiving a sample to add to the training dataset;
   calculating a weight for the sample using at least a target location for the cascade classifier;
   modifying the training dataset using the sample and the weight;
   performing a weighted training for the cascade classifier of the machine-learning classification system using the modified training dataset;
   identifying computer malware using the cascade classifier; and
   in response to identifying the computer malware, performing a security action to protect the one or more computing devices from the computer malware.

2. The computer-implemented method of claim 1, wherein calculating the weight for the sample further comprises:
   obtaining a depth of the sample in the machine-learning classification system;
   receiving the target location for the cascade classifier; and
   calculating the weight for the sample using the depth of the sample and the target location for the cascade classifier.

3. The computer-implemented method of claim 2, wherein the depth of the sample is a location of the sample in the machine-learning classification system.

4. The computer-implemented method of claim 2, wherein the target location of the cascade classifier is a location for the cascade classifier to be inserted into the machine-learning classification system.

5. The computer-implemented method of claim 2, further comprising:
   adding noise to the weight to regularize the cascade classifier during the weight training.

6. The computer-implemented method of claim 1, further comprising:
   receiving an additional sample to add to the training dataset usable to train the cascade classifier of the machine-learning classification system;
   calculating an additional weight;
   remodifying the training dataset using the additional sample and the additional weight; and
   performing an additional weighted training for the cascade classifier of the machine-learning classification system using the remodified training dataset.

7. The computer-implemented method of claim 1, wherein the training dataset comprises a set of samples and a label for each of the set of samples, wherein the label for each of the set of samples includes a respective weight for each of the set of samples.

8. The computer-implemented method of claim 1, wherein the training dataset comprises at least one of:
   malicious applications; and
   benign applications.

9. The computer-implemented method of claim 1, wherein the training dataset comprises at least one of:
   malicious webpages; and
   benign webpages.

10. The computer-implemented method of claim 1, wherein the security action comprises one or more of:
   using an additional cascade classifier of the machine-learning classification system;

flagging the sample for a remedial action; and
removing the sample.

11. A system for improving performance of cascade classifiers for protecting against computer malware, the system comprising:
one or more computing devices comprising at least one physical processor; and
physical memory comprising computer-executable instructions that, when executed by the at least one physical processor, cause the one or more computing devices to:
receive a training dataset usable to train a cascade classifier of a machine-learning classification system;
receive a sample that is to be added to the training dataset;
calculate a weight for the sample using at least a target location for the cascade classifier;
modify the training dataset using the sample and the weight;
perform a weighted training for the cascade classifier of the machine-learning classification system using the modified training dataset;
identify computer malware using the cascade classifier; and
in response to identifying the computer malware, performing a security action to protect the one or more computing devices from the computer malware.

12. The system of claim 11, wherein the computer-executable instructions further cause the one or more computing devices to:
obtain a depth of the sample in the machine-learning classification system;
receive the target location for the cascade classifier; and
calculate the weight for the sample using the depth of the sample and the target location for the cascade classifier.

13. The system of claim 12, wherein the depth of the sample is a location of the sample in the machine-learning classification system.

14. The system of claim 12, wherein the target location of the cascade classifier is a location for the cascade classifier to be inserted into the machine-learning classification system.

15. The system of claim 12, wherein computer-executable instructions further cause the one or more computing devices to:
add noise to the weight to regularize the cascade classifier during the weighted training.

16. The system of claim 11, wherein computer-executable instructions further cause the one or more computing devices to:
receive an additional sample to add to the training dataset usable to train the cascade classifier of the machine-learning classification system;
calculate an additional weight;
remodify the training dataset using the additional sample and the additional weight; and
perform an additional weighted training for the cascade classifier of the machine-learning classification system using the remodified training dataset.

17. The system of claim 11, wherein the training dataset comprises a set of samples and a label for each of the set of samples, wherein the label for each of the set of samples includes a respective weight for each of the set of samples.

18. The system of claim 11, wherein the training dataset comprises at least one of:
malicious applications; and
benign applications.

19. The system of claim 11, wherein the security action comprises one or more of:
using an additional cascade classifier of the machine-learning classification;
flagging the sample for a remedial action; and
removing the sample.

20. A non-transitory computer-readable medium comprising one or more computer-executable instructions that, when executed by at least one processor of a computing device, cause the computing device to:
receive a training dataset usable to train a cascade classifier of a machine-learning classification system;
receive a sample to add to the training dataset;
calculate a weight for the sample using at least a target location for the cascade classifier;
modify the training dataset using the sample and the weight;
perform a weighted training for the cascade classifier of the machine-learning classification system using the modified training dataset;
identify computer malware using the cascade classifier; and
in response to identification of the computer malware, perform a security action to protect the one or more computing devices from the computer malware.

* * * * *